US 9,557,619 B2

(12) United States Patent
Park et al.

(10) Patent No.: US 9,557,619 B2
(45) Date of Patent: Jan. 31, 2017

(54) DATA LINE-TO-PIXEL DECOUPLING

(75) Inventors: Young Bae Park, San Jose, CA (US); Cheng Chen, Cupertino, CA (US); Shih Chang Chang, Cupertino, CA (US); Zhibing Ge, Sunnyvale, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1110 days.

(21) Appl. No.: 13/245,635

(22) Filed: Sep. 26, 2011

(65) Prior Publication Data

US 2013/0076600 A1 Mar. 28, 2013

(51) Int. Cl.
*G02F 1/1362* (2006.01)
*G02F 1/136* (2006.01)

(52) U.S. Cl.
CPC ......... *G02F 1/136286* (2013.01); *G02F 2001/13606* (2013.01); *G09G 2300/043* (2013.01); *G09G 2300/0426* (2013.01)

(58) Field of Classification Search
None
See application file for complete search history.

(56) References Cited

U.S. PATENT DOCUMENTS

| 7,652,223 | B2 * | 1/2010 | Tanase et al. ............ 219/121.14 |
| 2004/0239824 | A1 | 12/2004 | Ahn |
| 2005/0185107 | A1 * | 8/2005 | Ban et al. ..................... 349/42 |
| 2009/0147168 | A1 | 6/2009 | Lu |
| 2009/0310073 | A1 * | 12/2009 | Jeong et al. ................. 349/139 |
| 2010/0231818 | A1 | 9/2010 | Min |
| 2011/0102309 | A1 * | 5/2011 | Cho ............................... 345/92 |
| 2011/0128280 | A1 * | 6/2011 | Tseng et al. ................. 345/214 |

* cited by examiner

*Primary Examiner* — Nicholas Lee
*Assistant Examiner* — Duane N Taylor, Jr.
(74) *Attorney, Agent, or Firm* — Fletcher Yoder PC

(57) ABSTRACT

Embodiments of the present disclosure relate to display devices and electronic devices incorporating a data line distribution segment between neighboring pixel electrodes. Specifically, embodiments of the present disclosure employ a uniformly distributed data line distribution segment coupled to a data line so as to cause a substantially uniform data line-to-pixel electrode capacitance with the neighboring pixel electrodes even when the data line is disposed closer to one of the neighboring pixel electrodes than the other.

23 Claims, 19 Drawing Sheets

DATA LINE-TO-PIXEL DECOUPLING

BACKGROUND

The present disclosure relates generally to electronic device displays, and, more particularly, to reducing non-uniform capacitance coupling between a data line and neighboring pixels.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

During the fabrication of electronic device displays, a data line is aligned between a plurality of neighboring pixels. Often times, numerous electronic device displays are fabricated at one time by creating a large display panel glass that is divided into individual electronic device displays. As the large display sections are fabricated, extra precaution may be required to provide uniform spacing between the data line and the neighboring pixels. Large display sections may increase the risk of the data lines having a non-uniform alignment with neighboring pixel electrodes. Further, as these displays increase in resolution, it becomes increasingly difficult to maintain proper alignment between the data line and these neighboring pixels. Improper alignment of the data line may result in the capacitance between the data line and one neighboring pixel to be substantially greater than the capacitance between the data line and another neighboring pixel. Such non-uniformity in capacitance may result in decreased brightness and image quality for the display device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for reducing non-uniform capacitance between a data line and neighboring pixels. Data lines of electronic device displays send image data signals to neighboring pixels. Often times, numerous electronic device displays are fabricated at one time by creating a large display panel glass that is divided into individual electronic device displays. For example, during the manufacturing of display screens, a large display panel glass measuring 2×2.5 meters may be manufactured and divided into numerous iPad™ device displays. As the large display sections are fabricated, extra precaution may be required to provide uniform spacing between the data line and the neighboring pixels. Large display sections may increase the risk of the data lines having a non-uniform alignment with neighboring pixel electrodes. As previously discussed, a non-uniform alignment may result in non-uniform capacitance between the data line and the neighboring pixels, resulting in decreased display quality.

In some embodiments, a data line distribution segment may be added to the display circuitry to distribute conductive properties of the data line evenly between the data line's neighboring pixels. The evenly distributed conductive properties of the data line may help to reduce non-uniform capacitance between the data line and the neighboring pixels, and thus may increase display quality.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
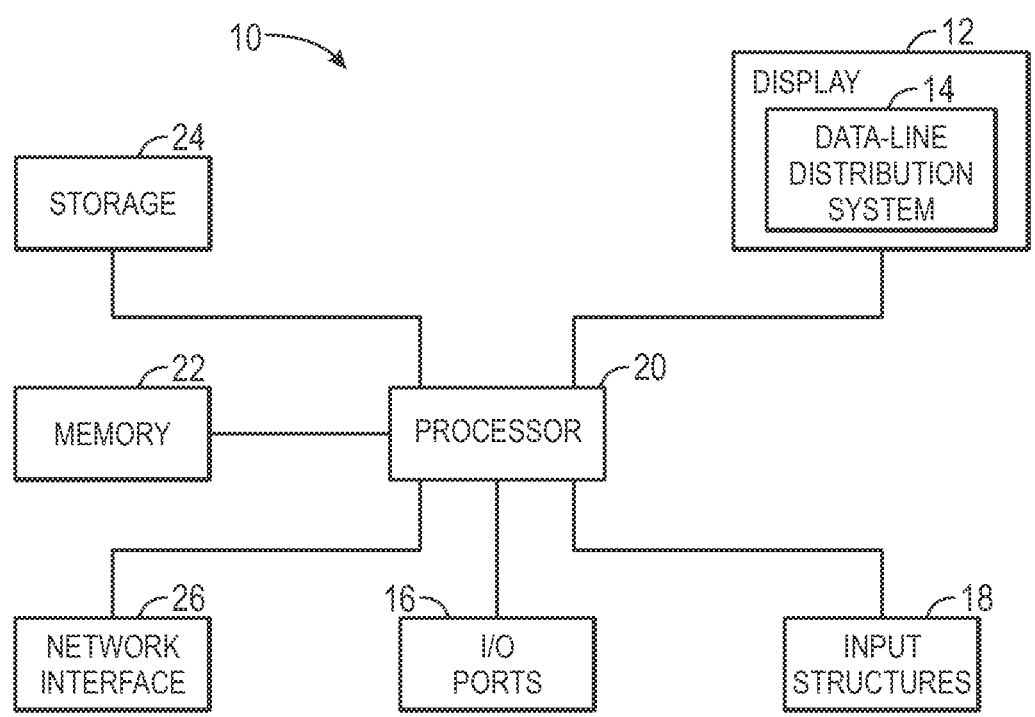
FIG. 1 is a schematic block diagram of an electronic device with a display using a data line distribution system to reduce non-uniform capacitance, in accordance with an embodiment.

As may be appreciated, electronic devices may include various components that contribute to the function of the device. For instance, FIG. 1 is a block diagram illustrating components that may be present in one such electronic device 10. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. FIG. 1 is only one example of a particular implementation and is merely intended to illustrate the types of components that may be present in the electronic device 10. For example, in the presently illustrated embodiment, these components may include a display 12 with a data line distribution segment 14, input/output (I/O) ports 16, input structures 18, one or more processors 20, one or more memory devices 22, non-volatile storage 24, and a networking device 26.

The display 12 may be used to display various images generated by the electronic device 10. For example, the processor 20 may provide image data to the display 12. Further, the non-volatile storage 24 may be configured to store image data provided by the processor 20. The display 12 may be any suitable liquid crystal display (LCD), such as a fringe-field switching (FFS) and/or an in-plan switching (IPS) LCD. The data line distribution segment 14 provides a substantially uniform capacitance between a data line and neighboring pixels of the display 12 when the data line is not equally distributed between the neighboring pixels. Uniform capacitance between the data line and neighboring pixel electrodes may result in increased brightness and image quality of the display 12. Additionally, in certain embodiments of the electronic device 10, the display 12 may be provided in conjunction with a touch-sensitive element, such as a touch-screen, that may be used as part of the control interface for the electronic device 10.

Figure 2:
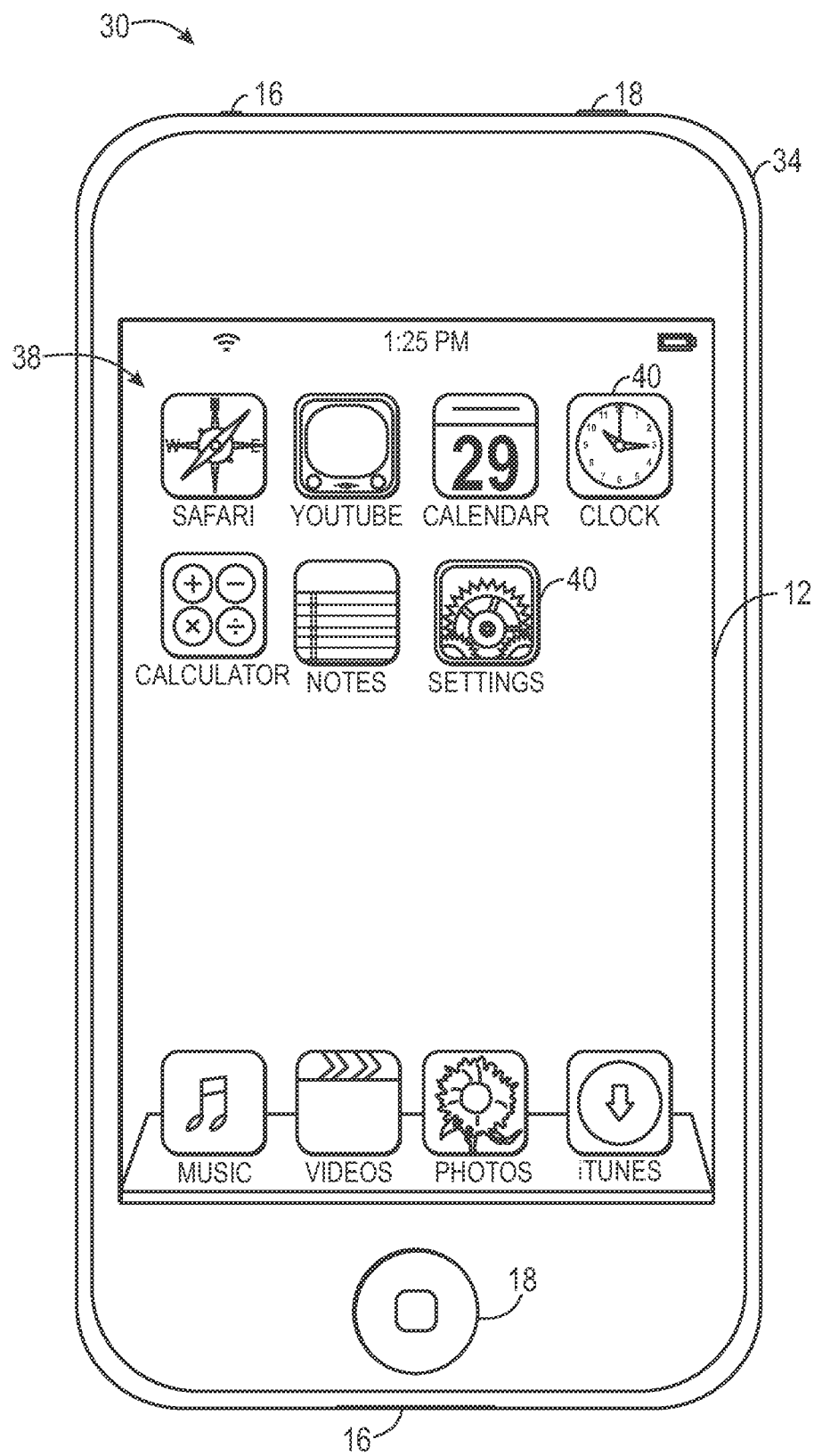
FIG. 2 is a perspective view of a handheld electronic device having the capabilities of the electronic device of FIG. 1, in accordance with an embodiment.

The electronic device 10 may take the form of a cellular telephone or some other type of electronic device. In certain embodiments, electronic device 10 in the form of a handheld electronic device may include a model of an iPhone® available from Apple Inc. of Cupertino, Calif. By way of example, an electronic device 10 in the form of a handheld electronic device 30 (e.g., a cellular telephone) is illustrated in FIG. 2 in accordance with one embodiment. The depicted handheld electronic device 30 includes a housing 34, a display 12 (e.g., in the form of an LCD or some other suitable display), I/O ports 16, and input structures 18.

In the depicted embodiment, the handheld electronic device 30 includes the display 12. The display 12 may display various images generated by the handheld electronic device 30, such as a graphical user interface (GUI) 38 having one or more icons 40. A user may interact with the handheld device 30 by touching the display and accessing the graphical user interface 38 when the display 12 includes touch-screen capabilities.

Although an electronic device 10 is generally depicted in the context of a cellular phone in FIG. 2, an electronic device 10 may also take the form of other types of electronic devices. In some embodiments, various electronic devices 10 may include media players, personal data organizers, handheld game platforms, cameras, and combinations of such devices. For instance, the device 10 may be provided in the form of handheld electronic device 30 that includes various functionalities (such as the ability to take pictures, make telephone calls, access the Internet, communicate via email, record audio and video, listen to music, play games, and connect to wireless networks). In another example, the electronic device 10 may also be provided in the form of a portable multi-function tablet computing device. By way of example only, the tablet computing device may be a model of an iPad® tablet computer, available from Apple Inc. Alternatively, the electronic device 10 may also be provided in the form of a desktop or notebook computer with the display 12. For example, the desktop or notebook computer may be a model of an iMac®, MacBook Air®, or MacBook Pro®.

In any of these electronic devices, the display 12 may include a display panel having an array or matrix of picture elements (i.e., pixels). In operation, the display 12 generally operates to modulate the transmission of light through the pixels by controlling the orientation of liquid crystal disposed at each pixel. In general, the orientation of the liquid crystals is controlled by a varying an electric field associated with each respective pixel, with the liquid crystals being oriented at any given instant by the properties (strength, shape, and so forth) of the electric field.

Different types of LCDs may employ different techniques in manipulating these electrical fields and/or the liquid crystals. For example, certain LCDs employ transverse electric field modes in which the liquid crystals are oriented by applying an in-plane electrical field to a layer of the liquid crystals. Example of such techniques include in-plane switching (IPS) and fringe field switching (FFS) techniques, which differ in the electrode arrangement employed to generate the respective electrical fields.

While control of the orientation of the liquid crystals in such displays may be sufficient to modulate the amount of light emitted by a pixel, color filters may also be associated with the pixels to allow specific colors of light to be emitted by each pixel. For example, in embodiments where the display 12 is a color display, each pixel of a group of pixels may correspond to a different primary color. For example, in one embodiment, a group of pixels may include a red pixel, a green pixel, and a blue pixel, each associated with an appropriately colored filter. The intensity of light allowed to pass through each pixel (by modulation of the corresponding liquid crystals), and its combination with the light emitted from other adjacent pixels, determines what color(s) are perceived by a user viewing the display. As the viewable colors are formed from individual color components (e.g., red, green, and blue) provided by the colored pixels, the colored pixels may also be referred to as unit pixels.

Figure 3:
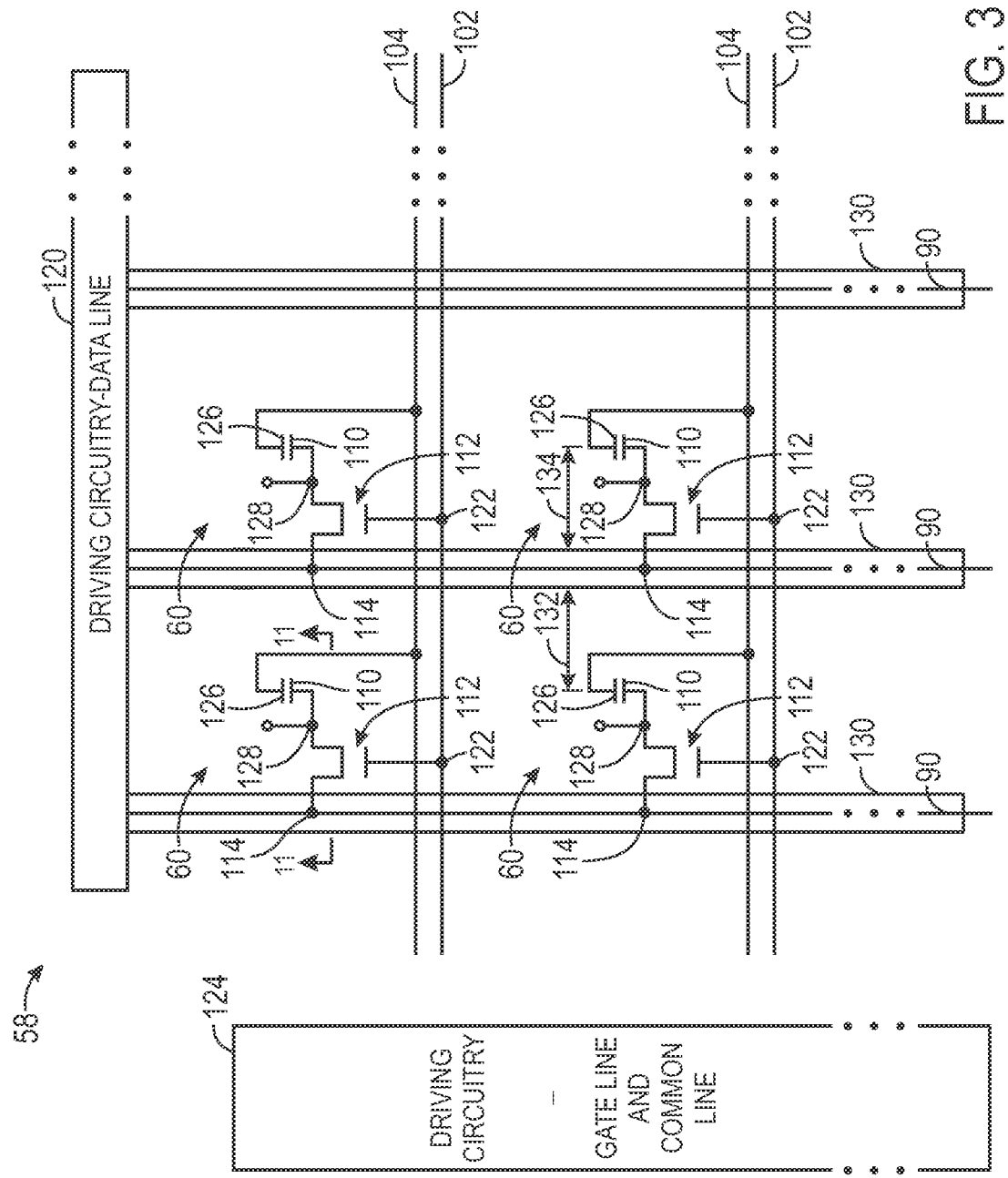
FIG. 3 is a circuit diagram of display circuitry of LCD pixels, in accordance with aspects of the present disclosure, in accordance with an embodiment.

Referring now to FIG. 3, an example of a circuit view of display circuitry 58 found in a display 12 is provided. As depicted, the pixels 60 may be disposed in a matrix that forms an image display region of the display 12. In such a matrix, each pixel 60 may be generally defined by the intersection of data or source lines (or "wires") 90 and scanning or gate lines (or "wires") 102. The pixel array may also include common lines (or "wires") 104 to apply voltages to common electrodes of the pixel array.

In this example, each pixel 60 includes a pixel electrode 110 and thin film transistor (TFT) 112 for switching the pixel electrode 110. In the depicted embodiment, the source 114 of each TFT 112 is electrically connected to a data line 90, extending from respective data line driving circuitry 120. Similarly, in the depicted embodiment, the gate 122 of each TFT 112 is electrically connected to a scanning or gate line 102, extending from driving circuitry 124. In addition to circuitry for driving the gate lines 102, the driving circuitry 124 also includes common line driving circuitry to apply voltages to the common lines 104, which allow such voltages to be applied to common electrodes 126. In the depicted embodiment, the pixel electrode 110 is electrically connected to a drain 128 of the respective TFT 112.

In one embodiment, the data line driving circuitry 120 sends image or data signals to the pixels via the respective data lines 90. Such image signals may be applied by line-sequence (i.e., the data lines 90 may be sequentially activated during operation). The gate lines 102 may apply scanning signals from the driving circuitry 124 to the gate 122 of each TFT 112 to which the respective scanning lines 102 connect. Such scanning signals may be applied by line-sequence with a predetermined timing and/or in a pulsed manner.

Each TFT 112 serves as a switching element which may be activated and deactivated (i.e., turned on and off) for a predetermined period based on the respective presence or absence of a scanning signal at the gate 122 of the TFT 112. When activated, a TFT 112 may store the image signals received via a respective data line 100 as a charge in the pixel electrode 110 with a predetermined timing.

It may be appreciated that during the fabrication process of the display circuitry 58, the data lines 90 may become misaligned, causing the data lines 90 to be closer to one neighboring pixel 60 than another. This misalignment may cause brightness inconsistencies or other image degradation, due to non-uniform capacitance between the data line 90 and its neighboring pixels 60. Thus, as will be described in more detail below, one or more data line distribution segments 130 may be added to the display circuitry 58 to mitigate potential data line 90 misalignment. The data line distribution segments 130 are disposed uniformly between pixel electrodes 110 of the neighboring pixels 60 and electrically coupled to data lines 90. For example, the data line distribution segments 130 may include any suitable conductive material and in certain embodiments may be made of indium tin oxide (ITO). In certain embodiments, the uniform alignment of the data line distribution segments 130 and the pixel electrodes 110 may be ensured by disposing the pixel electrodes 110 and the data line distribution segments 130 at the same time, thus allowing the distances between the data line distribution segments 130 and the pixel electrodes 110 to be controlled. For example, the distance 132 between the pixel electrode 110 of the left neighboring pixel 60 is equal to the distance 134 between the pixel electrode 110 of the right neighboring pixel 60. As mentioned above, the data lines 90 are electrically coupled to the data line distribution segments 130 such that the conductive properties of the data lines 90 are distributed throughout the data line distribution segments 130. Because the data line distribution segments 130 are evenly spaced between the pixel electrodes 110 and the conductive properties of the data lines 90 are distributed throughout the data line distribution segments 130, the capacitance between the data line 90 and the neighboring pixel electrodes may be substantially uniform, regardless of any data line 90 misalignment that may be present.

Figure 21:
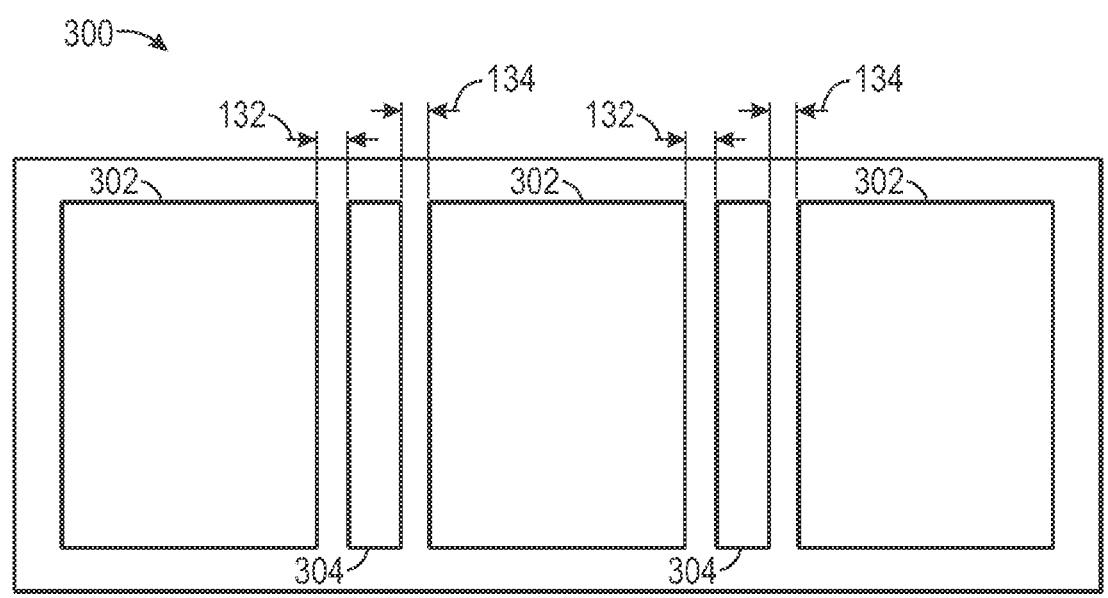
FIG. 21 is an illustration of an etching pattern useful in patterning a data line distribution segment, in accordance with an embodiment.

The uniform distribution of the data line distribution segments 130 between neighboring pixel electrodes 110 can be controlled by patterning the pixel electrodes 110 and the data line distribution segments 130 in the same fabrication step. For example, FIG. 21 illustrates an embodiment of etching pattern 300 that patterns data line distribution segments 130 and pixel electrodes 110 in the same manufacturing step. The etching pattern 300 includes one or more masks 302 that are used to pattern the pixel electrodes 110. Additionally, the etching pattern 300 includes one or more masks 304 that are used to pattern the data line distribution segments 130. Because the pixel electrodes 110 and the data line distribution segments 130 are patterned at the same time, the distances 132 and 134 between the data line distribution segments 130 and the neighboring pixel electrodes 110 can be controlled to be substantially equal. Also, since the pixel electrodes 110 and data line distribution segments 130 are patterned during the same fabrication step, they will typically be made of the same suitable conductive material as data line distribution segments 130.

Figure 4:
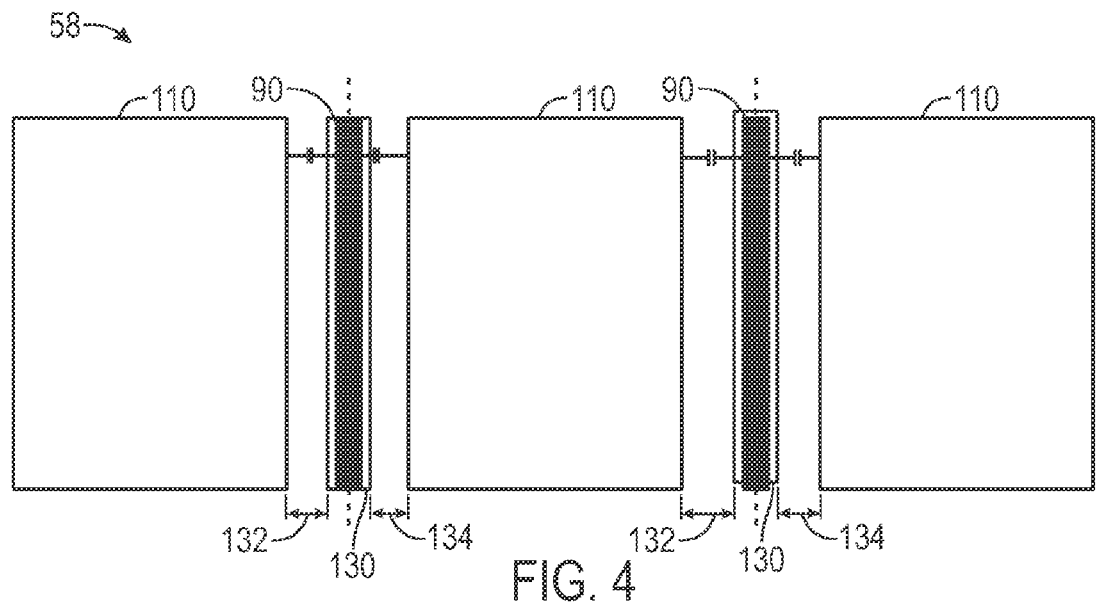
FIG. 4 is a schematic view of display circuitry with a data line distribution segment, where the data line is properly aligned between neighboring pixels, in accordance with an embodiment.

FIG. 4 illustrates display circuitry 58 that includes data line distribution segments 130. The data line distribution segments 130 are evenly distributed between pixel electrodes 110 in a generally parallel fashion. Because the distances 132 and 134 between the pixel electrodes 110 and the data line distribution segments 130 are substantially equal, the capacitance between the data line distribution segments 130 and the pixel electrodes 110 are substantially similar. In the depicted embodiment, the data lines 90 are uniformly distributed along the data line distribution segments 130 and are electrically coupled to the data line distribution segments 130.

Figure 5:
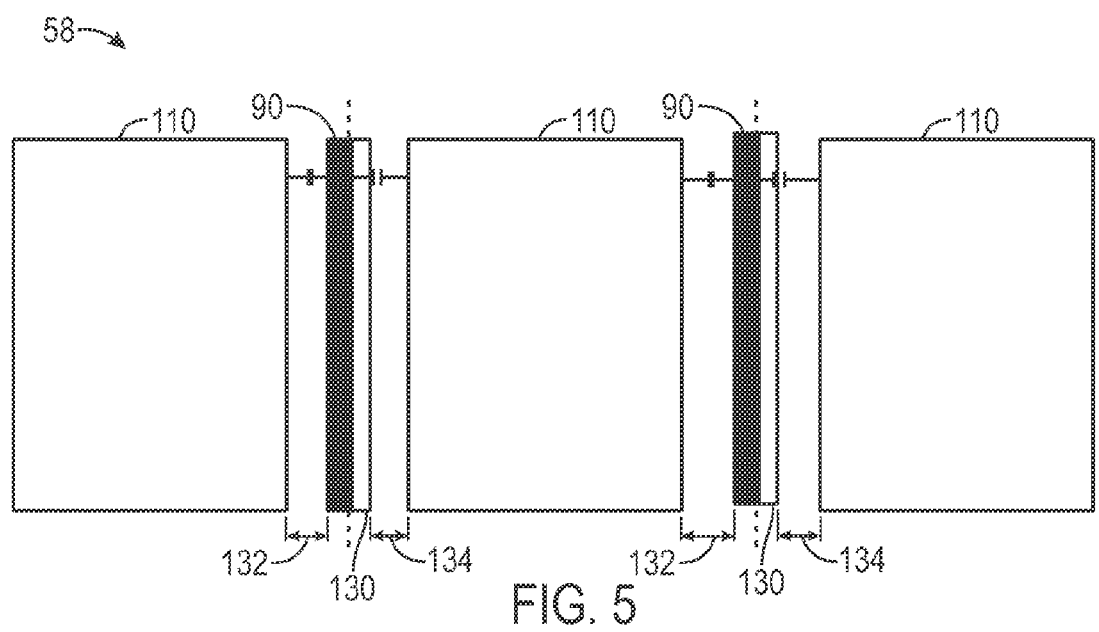
FIG. 5 is a schematic view of the display circuitry of FIG. 4, in which the data line is improperly aligned, in accordance with an embodiment.

Regardless of whether the data line 90 is aligned with uniform spacing between the pixel electrodes 110, the data line-to-pixel electrode capacitance between neighboring pixel electrodes 110 and the data lines 90 may remain substantially similar because of the uniform charge distribution brought about by the data line distribution segments 130. For example, in FIG. 5, the data line 90 has shifted left, and thus is closer to the left neighboring pixels electrode 110 than the right pixel electrode 110. If the display 12 did not employ data line distribution segments 130, the capacitance between the data line 90 and the left pixel electrodes 110 would be substantially larger than the capacitance between the data line 90 and the right pixel electrodes 110. However, when a data line distribution segment 130 is present, these disparities may be reduced. As data is sent through the data lines 90, the conductive properties of the data lines 90 are distributed to the data line distribution segments 130 electrically coupled to the data lines 90. In certain embodiments, the data line distribution segments 130 are electrically coupled to the data lines 90 by placing the data line distribution segments 130 and data lines 90 in direct contact with one another. Alternatively, the data line distribution segments 130 may be electrically coupled to the data lines 90 through via holes. Because the data line distribution segments 130 are uniformly spaced between the neighboring pixel electrodes 110, the data line-to-pixel capacitance between the neighboring pixel electrodes 110 and the data lines 130, may remain substantially similar, regardless of where the data lines 90 are aligned on the data line distribution segments 130.

For example, in one sample case, data line-to-pixel electrode capacitances were modeled and compared between display circuitry 58 with a data line distribution segment 130 and display circuitry without a data line distribution segment 130. The simulation results showed that in the case of the display circuitry with no data line distribution segment 130, when the data lines 90 were aligned with equal distances between neighboring pixels, the data line-to-pixel capacitances for the left and right pixel electrodes 60 were substantially similar, each measuring approximately $1.01 \times 1E-16$. However, when the data line 90 was shifted to the left 1.5 micrometers, the left and right data line-to-pixel capacitances were substantially different, the left data line-to-pixel capacitance measuring $1.31 \times 1E-16$ and the right data line-to-pixel capacitance measuring $8.18 \times 1E-17$. Thus, the non-uniform alignment of the data lines 90 resulted in a 160% left to right capacitance ratio.

In the case of the circuitry with an included data distribution segment 130, when the data line 90 was centered between the left and right pixel electrodes 110 the left and right data line-to-pixel capacitances were substantially similar, each measuring approximately $1.42 \times 1E-16$. When the data line 90 was shifted left 1.5 micrometers, the left and right data line-to-pixel capacitances remained substantially similar, with the left data line-to-pixel capacitance measuring $1.44 \times 1E-16$ and the right data line-to-pixel capacitance measuring $1.41 \times 1E-16$. Thus, adding the data line distribution segments 130 resulted in a 102% left to right data line-to-pixel capacitance ratio with the mis-aligned data line 130.

As suggested by the test case, the data line distribution segment 130 may cause some increase in capacitance between the pixel electrodes 110 and the data line 90. However, the data line distribution segments 130 reduce the disparity between the left data line-to-pixel capacitances and the right data line-to-pixel capacitances.

Figure 6:
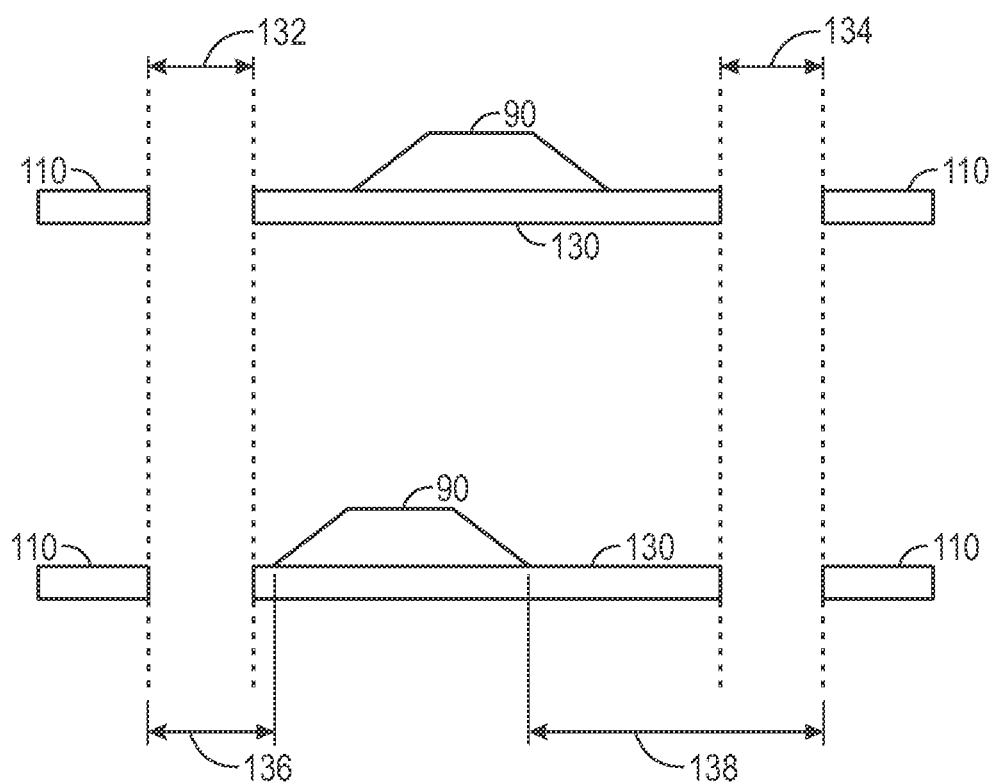
FIG. 6 is a schematic side view of the display circuitry, contrasting the properly aligned data line of FIG. 4 with the improperly aligned data line of FIG. 5, illustrating the uniform spacing between the data line distribution segment and the neighboring pixel electrodes, in accordance with an embodiment.

As depicted in FIG. 6, regardless of where the data line 90 is coupled to the data line distribution segment 130, the data line distribution segment 130 is properly aligned between the neighboring pixel electrodes 110. The data line distribution segment 130 is properly aligned because the data line distribution segments 130 and the pixel electrodes 110 are patterned at the same time. As shown, a distance 132 between the left pixel electrodes 110 and the data line distribution segments 130 is substantially equal to a distance 134 between the data distribution segments 130 and the right pixel electrodes 110. Even though the distances between the data line 90 and the pixel electrodes 110 may differ, the data line distribution segments 130 may act to regulate, or provide substantially similar, left and right data line-to-pixel capacitance values.

As previously mentioned, equal spacing of the data lines 90 between pixel electrodes 110 is a factor in determining display quality when no data line distribution segment 130 is present. FIGS. 7-10 illustrate electrical field variations that may occur based on the alignment of the data lines 90 between the pixel electrodes 110.

Figure 7:
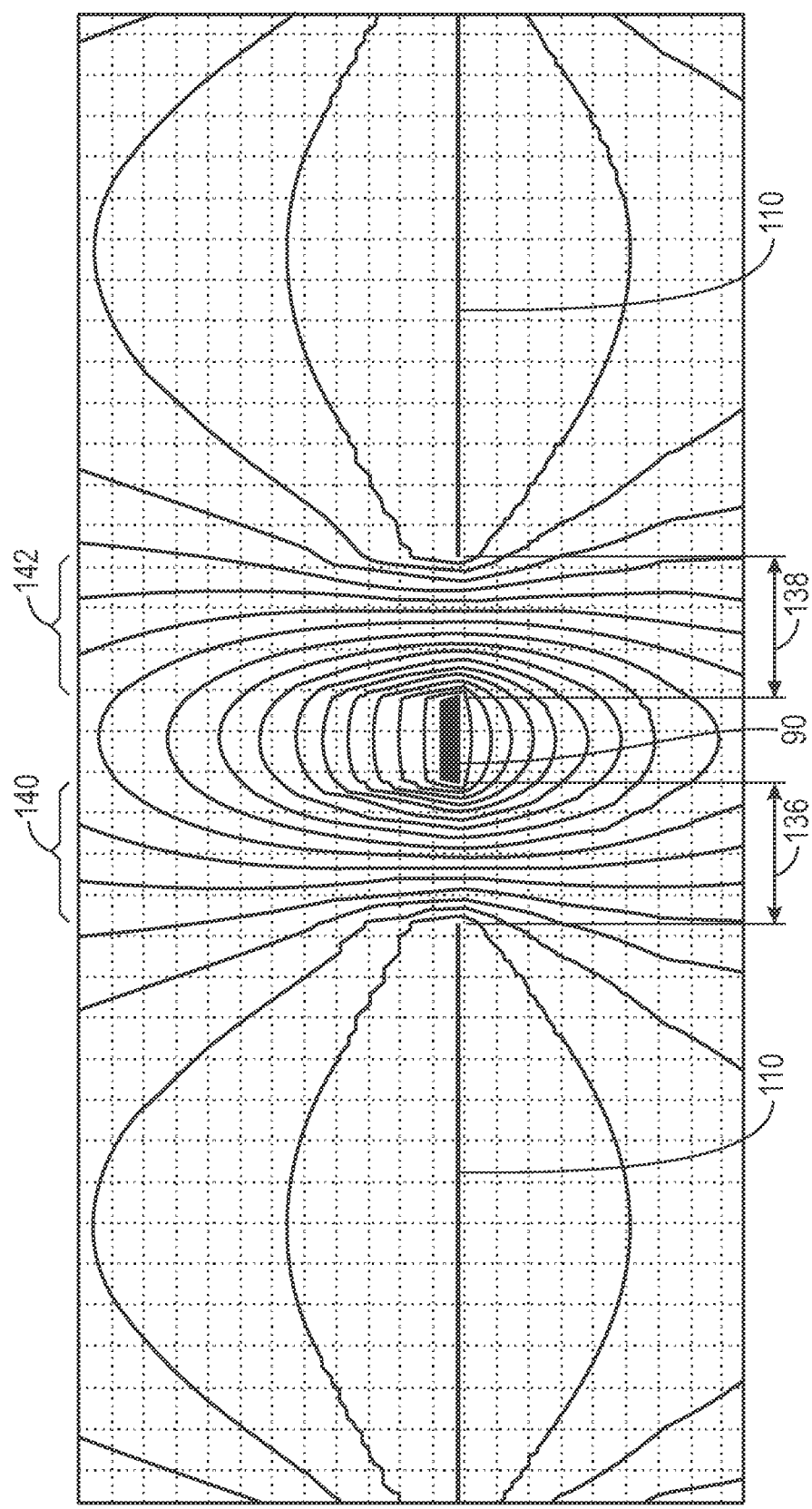
FIG. 7 is an electrical field diagram, illustrating a uniformity between in the electrical fields between the data line and neighboring pixel electrodes, when the the data line is properly aligned without a data line distribution segment, in accordance with an embodiment.

The electrical field lines of display circuitry 58 may help to illustrate the how data line distribution segments 130 may affect the data line-to-pixel capacitance of the display circuitry 58. For example, FIG. 7 illustrates simulated electrical field lines of display circuitry 58 that does not include a data line distribution segment 130, but is evenly spaced between neighboring pixel electrodes 110. Because the data line 90 is properly aligned (e.g., has equal spacing between left and right pixel electrodes 110), the field lines 140 between the data line 90 and the left neighboring pixel electrode 110 are substantially similar to the field lines 142 between the data line 90 and the right neighboring pixel electrode 110. The substantially similar field lines 140 and 142 illustrate that, when properly aligned, the data line-to-pixel capacitances between the data line 90 and the left and right pixel electrodes 110 are substantially the same.

Figure 8:
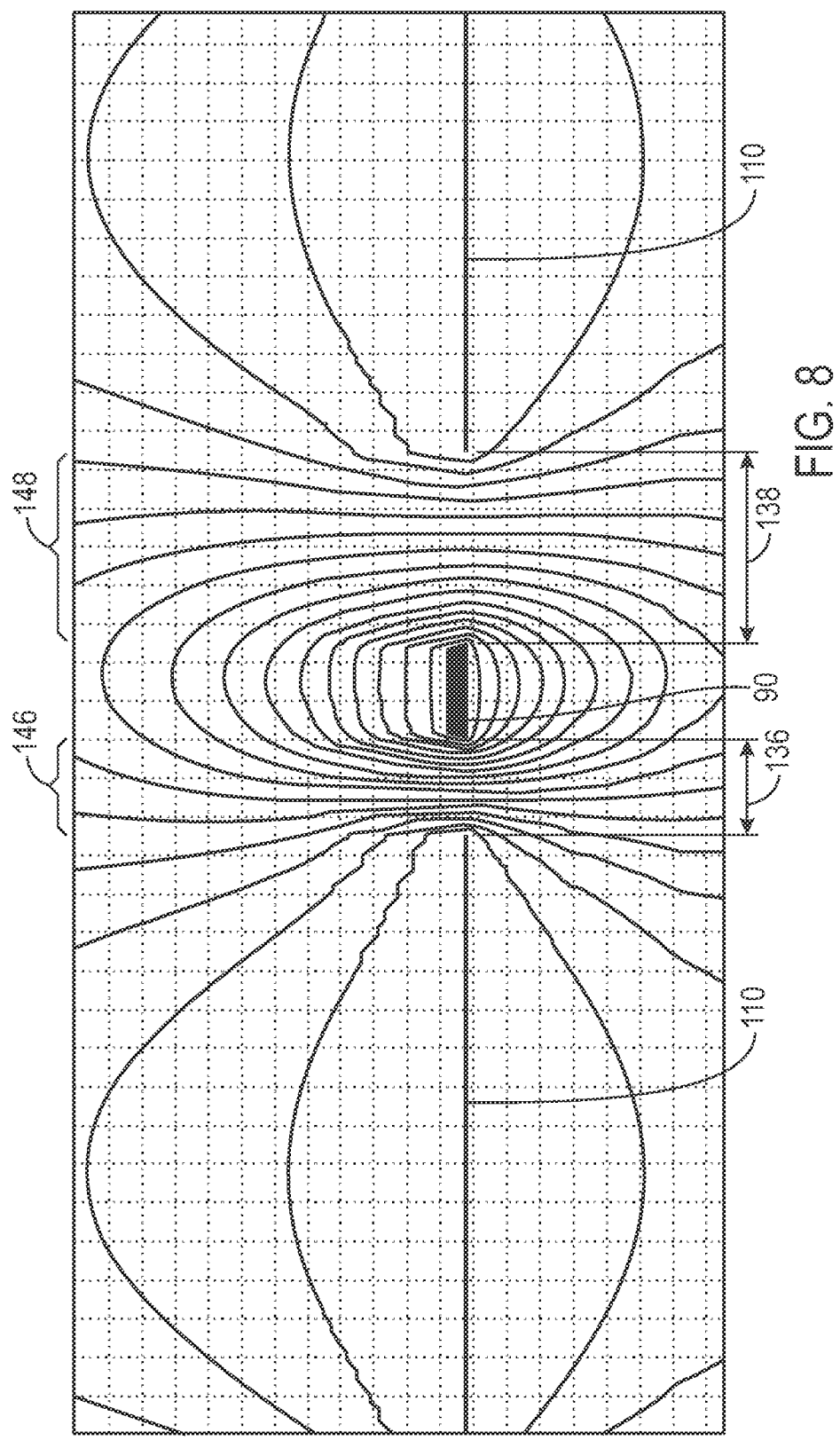
FIG. 8 is an electrical field diagram of display circuitry that does not include a data line distribution segment and the data line is non-uniformly aligned, illustrating a significant disparity between the capacitance of the data line and neighboring pixel electrodes, in accordance with an embodiment.

When the data line 90 is not aligned properly (e.g., is spaced closer to one neighboring pixel electrode 110 than another neighboring pixel electrode 110), and no data line distribution segments 130 are present, the data line-to-pixel capacitance may be substantially different. For example, FIG. 8 illustrates display circuitry 58, where the data line 90 is improperly aligned (e.g., the distance 136 between the data line 90 and the left neighboring pixel electrode 110 is less than the distance 138 between the data line 90 and the right neighboring pixel electrode 110). The field lines 146 between the data line 90 and the left neighboring pixel electrode 110 are more concentrated than the field lines 148 between the data line 90 and the right neighboring pixel electrode 110. The concentrated field lines illustrate that the data line-to-pixel capacitance between the data line 90 and the left neighboring pixel electrode 110 is greater than the data line-to-pixel capacitance between the data line 90 and the right neighboring pixel 110. As previously discussed, this is due to the smaller distance 136 of the data line 90 to the left pixel electrodes 110.

By adding a data line distribution segment 130, the data line-to-pixel capacitance may be regulated regardless of proper alignment of the data line 90. For example, FIGS. 9 and 10 illustrate simulated electrical field lines for display circuitry 58 with a data line distribution segment 130.

Figure 9:
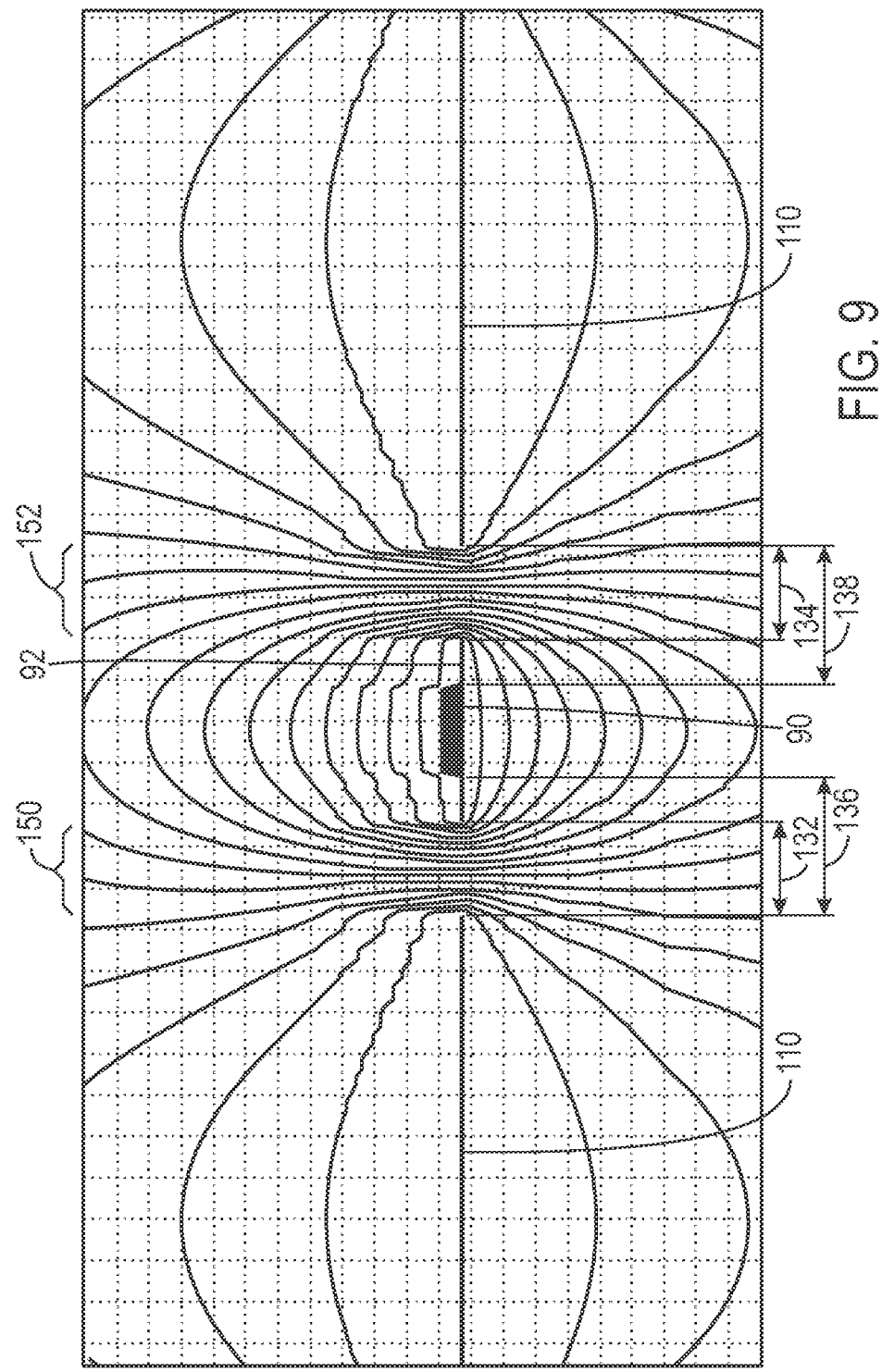
FIG. 9 is an electrical field diagram of display circuitry that includes a data line distribution segment and the data line is uniformly aligned, illustrating a uniform capacitance between the data line and the neighboring pixel electrodes, in accordance with an embodiment.
Figure 10:
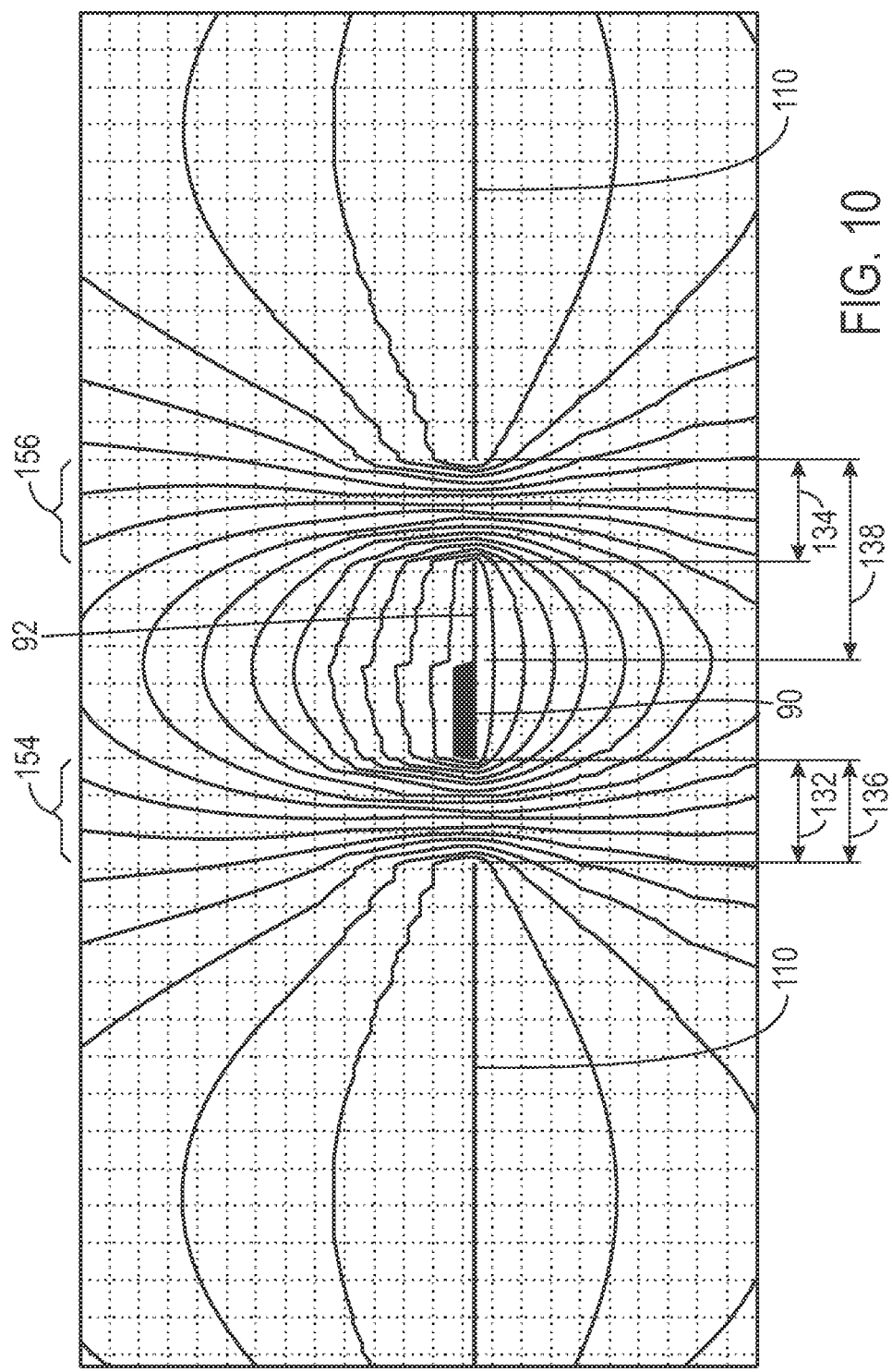
FIG. 10 is an electrical field diagram of display circuitry that includes a data line distribution segment and the data line is non-uniformly aligned, illustrating a substantially uniform coupling capacitance between the data line and the neighboring pixel electrodes, despite the non-uniform alignment of the pixel electrodes, in accordance with an embodiment.

FIG. 9 illustrates simulated electrical field lines for display circuitry 58 where the data line 90 is properly aligned between the left and right neighboring pixel electrodes 110 (e.g., distances 132 and 134 are substantially similar). As illustrated in FIG. 9, the data line distribution segment 130 may create an increased capacitance between the data line 90 and the neighboring pixel electrodes 110. For example, the field lines 150 and 152 are more concentrated than the field lines 140 and 142 of FIG. 7. However, similar to FIG. 7, the display circuitry 58 with the data line distribution segment 130 provides uniform capacitance between the data line 90 and the left and right pixel electrodes 110 when the data line 90 is evenly spaced between the pixel electrodes 110. This is illustrated by the concentration of field lines 150 and 152 being substantially similar.

When the data line 90 is improperly aligned, the data line distribution segment 130 may regulate the capacitance between the data line and the left and right pixel electrodes 110. For example, in FIG. 10, the data line 90 is spaced closer to the left pixel electrode 110 than the right pixel electrode 110 (e.g., distance 136 is less than distance 138). The conductive properties of the data line 90 may transfer to the electrically coupled data line distribution segment 130, allowing the capacitance of the properly aligned (e.g., distance 132 being substantially similar to 134) data line distribution segment 130, to regulate the data line-to-pixel capacitance of the display circuitry 58. As illustrated, the concentration of the field lines 154 between the data line distribution segment 130 and the left pixel electrode 110 is substantially similar to the concentration of field lines 156 between the data line distribution segment 130 and the right pixel electrode 110, signifying that the data line-to-pixel capacitances between the data line 90 and the left and right pixel electrodes 110 are substantially similar. Thus, the data line distribution segment 130 may provide a more consistent brightness and image quality.

Many different embodiments of display circuitry 58 with a data line distribution segment 130 may be feasible. For example, FIGS. 11-20 illustrate various cross-sectional views, taken along line 11-11 of FIG. 3, where the display circuitry 58 includes a data line distribution segment 130. The embodiments below include a substrate layer 166 that is the base of the display circuitry 58. As previously discussed, the gate lines 102 provide scanning signals from the driving circuitry 124 to the gates 122 of each TFT 112 to which the respective gate lines 102 connect. The gate insulator 168 insulates the gate lines 102 from the outer layers of the display circuitry 58. Additionally, the display circuitry 58 may include numerous passivation layers. The passivation layers provide electrical stability by isolating various elements of the display circuitry 58.

Figure 11:
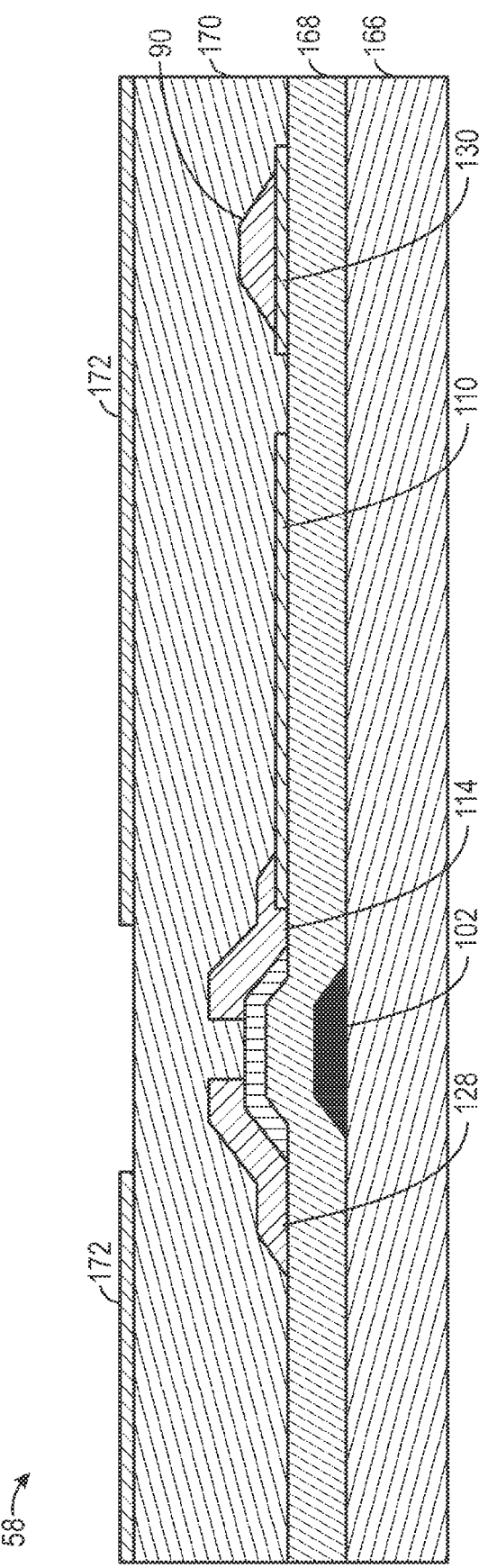
FIG. 11 is a cross-sectional view of display circuitry, taken along line 11-11 of FIG. 3, including a data line distribution segment that is deposited prior to the data line, in accordance with an embodiment.

FIG. 11 illustrates display circuitry 58 with a data line distribution segment 130 deposited underneath the data line 90. The display circuitry 58 includes a substrate layer 166 that provides the base of the display circuitry 58. A gate 102 is deposited on the substrate 166. A gate insulator 168 is deposited over the gate 102 and the substrate 166, and the data line distribution segment 130 and the pixel electrode 110 are deposited on the gate insulator 168. A source, drain, and data line 90 are deposited, where the data line 90 is electrically coupled to the data line distribution segment 130. A passivation layer 170 is deposited on top of the source, drain, pixel electrode 110, and the data line 90. A common voltage electrode 126 is deposited on top of the passivation layer 170.

Figure 12:
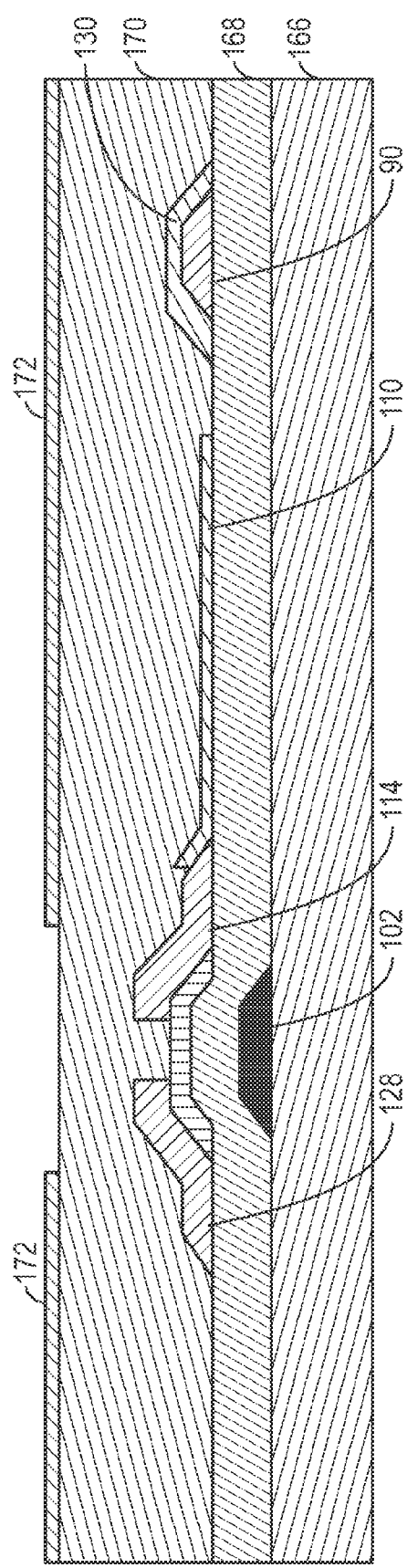
FIG. 12 is a cross-sectional view of display circuitry, taken along line 11-11 of FIG. 3, including a data line distribution segment that is deposited after the data line, in accordance with an embodiment.

In certain embodiments, a data line distribution segment 130 may be disposed above the data line 90, as illustrated in FIG. 12. The display circuitry 92 includes a substrate 166, gate 102, and gate insulator 168 similar to FIG. 11. A data line 90 is deposited on the gate insulator 168 along with a source 114 and drain 128. A data line distribution segment 130 and pixel electrode 110 are deposited in the same step, where the data line distribution segment 130 is electrically coupled to the data line 90. A passivation layer 170 is deposited on top of the source 114, drain 128, pixel electrode 110, and data line distribution segment 130. Additionally, a common voltage electrode 126 is deposited on top of the passivation layer 170.

Figure 13:
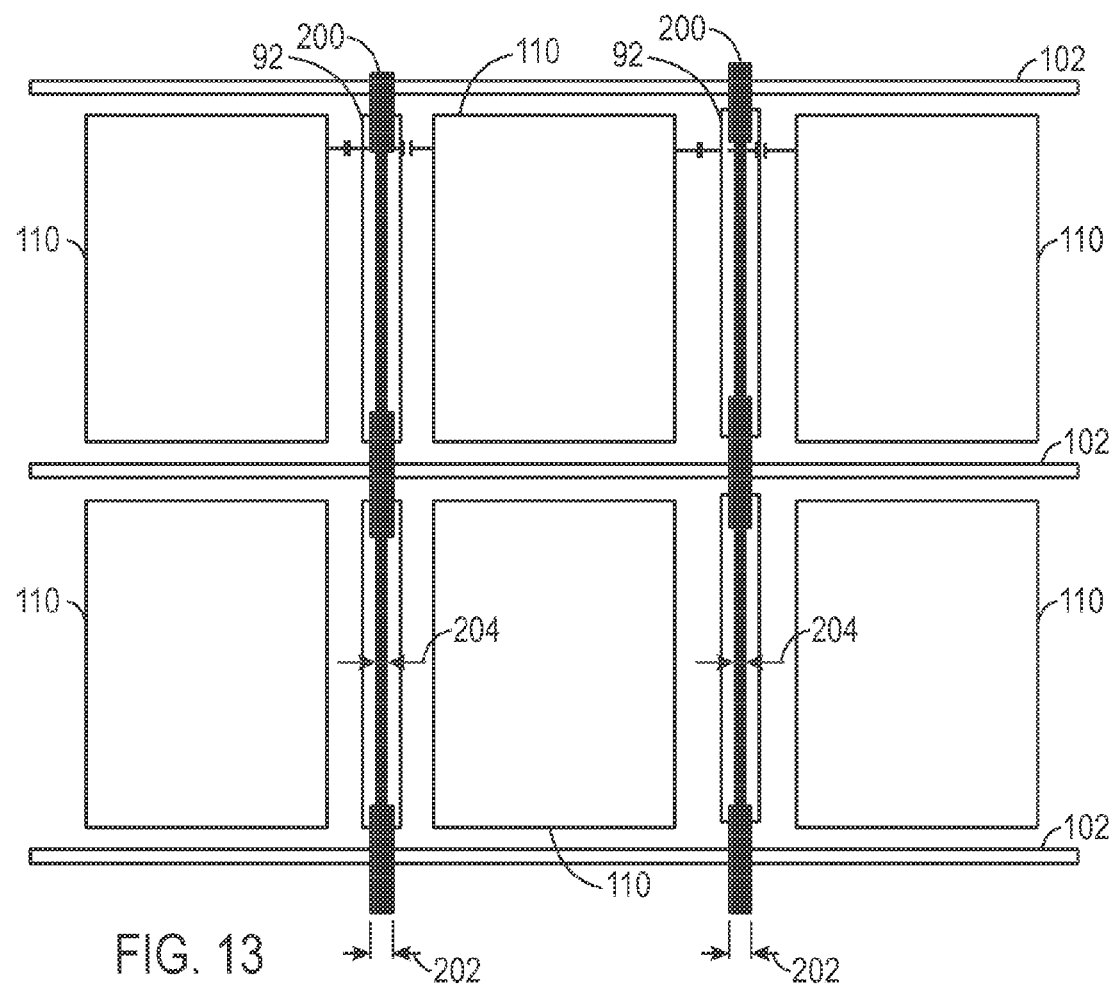
FIG. 13 is a schematic view of display circuitry that includes a data line distribution segment, in which the data line is narrowed between the pixel electrodes to reduce a coupling capacitance between the data line and neighboring pixel electrodes, in accordance with an embodiment.

As previously discussed, the data line distribution segment 130 may increase data line-to-pixel capacitance. In certain embodiments, the data line 90 may be narrowed as the data line 90 passes between a portion of the neighboring pixel electrodes 110 to reduce the data line-to-pixel capacitance. For example, FIG. 13 illustrates an embodiment of the display circuitry 58 with a variable-width data line 200. The variable width data line 200 may have a first width 202 where the data line 200 intersects a gate line 102. As the data line 200 passes parallel to neighboring pixel electrodes 110, the data line 200 may be narrowed to a second width 204. Because the data line distribution segment 130 is electrically coupled to the narrow portion (e.g., second width 204), the data line distribution segment 130 may regulate the data line-to-pixel capacitance between the data line 200 and the neighboring pixel electrodes 110.

Figure 14:
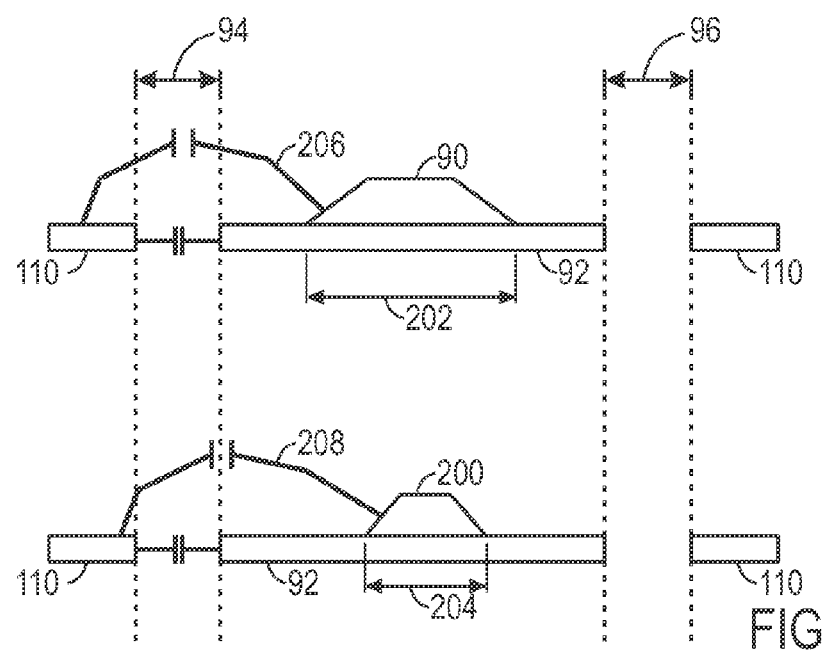
FIG. 14 is a schematic side view of the display circuitry of FIG. 13, illustrating a reduced coupling capacitance obtained by narrowing the data line between the pixel electrodes, in accordance with an embodiment.

Narrowing a portion of the data line 200 may result in decreased capacitance between the data line 200 and the neighboring pixel electrodes 110. For example, FIG. 14 illustrates a comparison between a data line 90 with a uniform width 202 and a data line 200 with a narrowed width 204. The conductive properties of the data line 90 with a consistent width 202 may create a data line-to-pixel conductance 206 between the data line 90 and the neighboring pixel electrodes 110. Similarly, the data line 200 with narrowed width 204 may create a data line-to-pixel conductance 208. However, because the narrow data line 200 is spaced further from the neighboring pixels 110, the capacitance 208 may be substantially less than the capacitance 206 produced by the data line 90.

Figure 15:
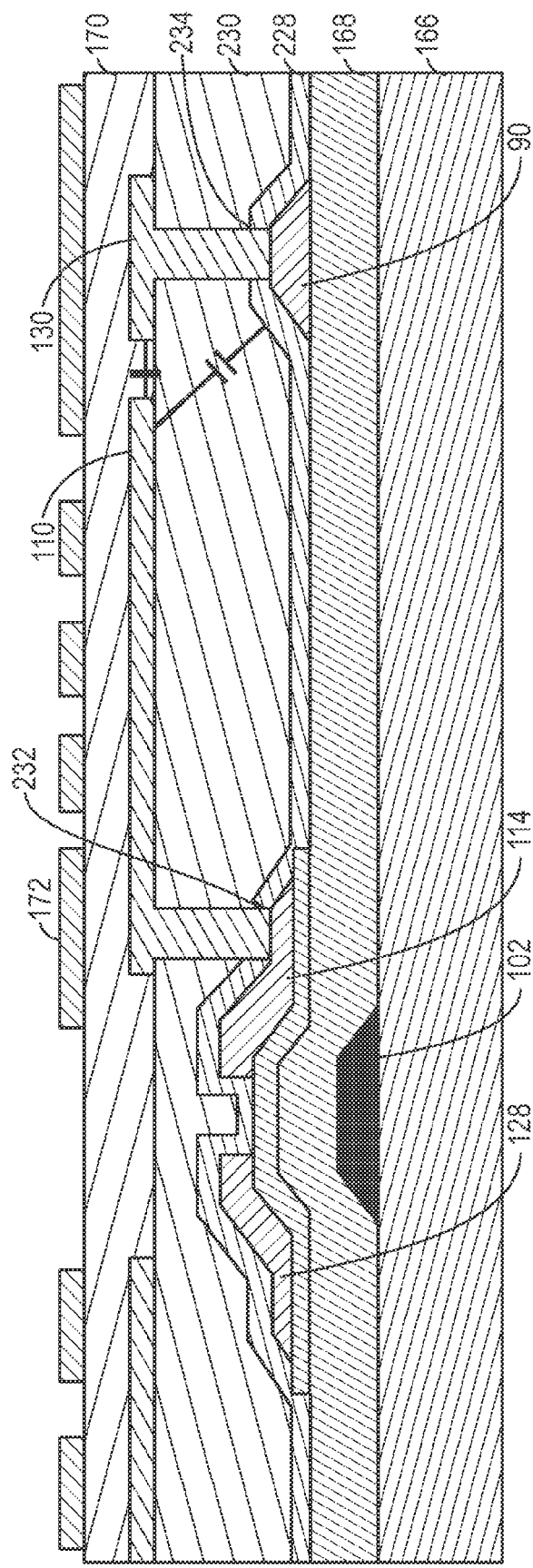
FIG. 15 is a cross-sectional view of display circuitry, taken along line 11-11 of FIG. 3, where the data line distribution segment is deposited after the data line and is electrically coupled to the data line through via holes disposed in an intermediate organic passivation layer and a source/drain passivation layer that are between the data line distribution segment and the data line, in accordance with an embodiment.

In certain embodiments, the display circuitry 58 with the data line distribution segment 130 may include multiple passivation layers. For example, the embodiment depicted in FIG. 15 illustrates display circuitry 58 with the passivation layer 170, a source/drain passivation layer 228, and an organic passivation layer 230, where the data line distribution segment 130 is disposed above the data line 90. The display circuitry 58 includes a substrate 166, gate 102, gate insulator 168 as discussed in the embodiments of FIGS. 11 and 12. A source 114, drain 128, and data line are deposited on the gate insulator 168. A source/drain passivation layer 228 is deposited on top of the source 114, drain 128, gate insulator 168, and data line 90. An organic passivation layer 230 is deposited on top of the source/drain passivation layer 228. A via hole, or vertical electrical connection between different layers of conductors, 234 is disposed in the organic passivation layer 230 and the source/drain passivation layer 228 over the data line 90. The pixel electrode 110 and data line distribution segment 130 are deposited using alignment techniques, such as depositing the pixel electrode 110 and the data line distribution segment 130 in the same fabrication step. The data line distribution segment 130 is deposited through the via hole 234, to electrically couple with the data line 90. An additional passivation layer 170 and common voltage electrode 126 are deposited on top of the pixel electrode 110, data line distribution segment 130, and organic passivation layer 230. As illustrated, the electrically coupled data line distribution segment 130 distributes some of the conductive properties (e.g., capacitance) from the data line 90 such that the data line-to-pixel capacitance may be regulated by data line distribution segment 130. Thus, the data line-to-pixel capacitance between the data line 90 and the neighboring pixel electrodes 110 may be substantially similar regardless of the alignment of the data line 90.

Figure 16:
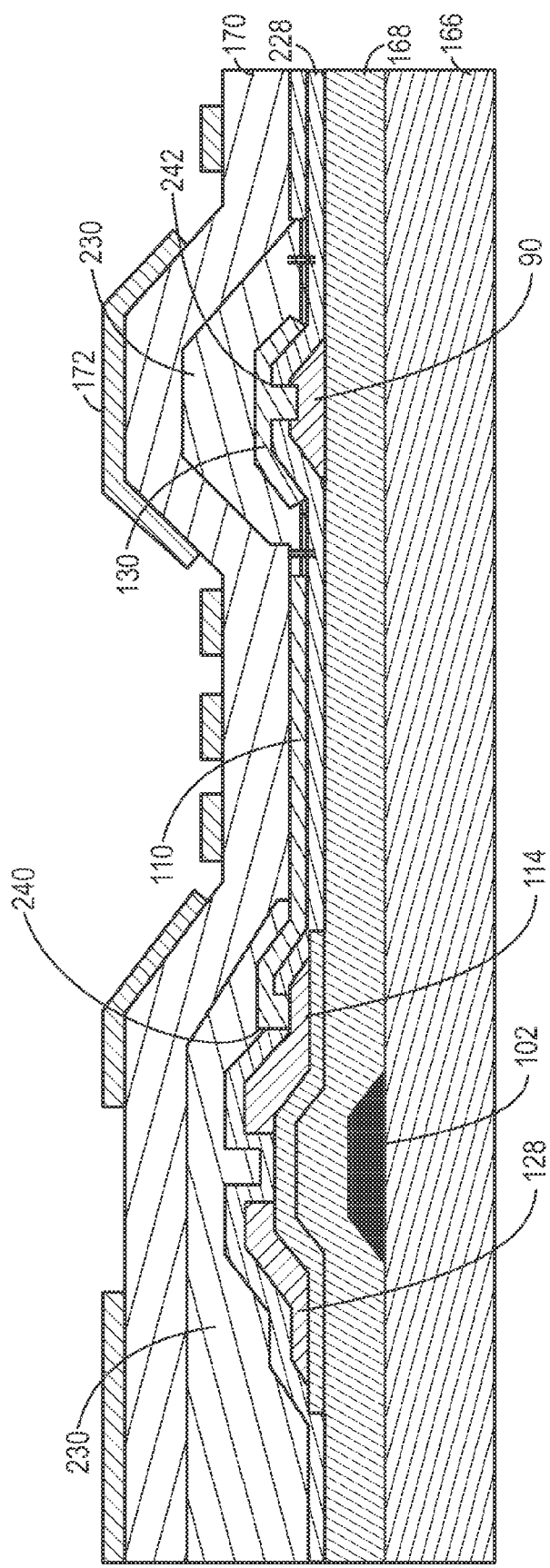
FIG. 16 is a cross-sectional view of display circuitry, taken along line 11-11 of FIG. 3, similar to FIG. 15, except that the organic passivation layer is deposited on top of the data line distribution segment, in accordance with an embodiment.

In certain embodiments, the organic passivation layer 230 may only cover the data line 90, the source 114, and the drain 128. FIG. 16 illustrates such an embodiment, where the data line distribution segment 130 is deposited above the data line 90. Similar to the embodiment of FIG. 15, the display circuitry 58 includes a substrate 166, a gate 102, a gate insulator 168, a source 114, a drain 128, a data line 90, and a source/drain passivation layer 228. The pixel electrodes 110 and the data line distribution segments 130 are deposited on top of the source/drain passivation layer 228. The pixel electrodes 110 may electrically couple with the source 114 through a via hole 240 disposed in the source/drain passivation layer 228 through to the source 114. The data line distribution segment 130 may be electrically coupled to the data line 90 through a via hole 242 disposed in the source/drain passivation layer 228, through to the data line 90. An organic passivation layer 230 is deposited over the source 114, drain 128, and data line distribution segment 130, while leaving a substantial portion of the pixel electrodes 110 exposed. The passivation layer 170 is deposited on top of the organic passivation layer 230 and the pixel electrodes 110. A common voltage electrode 126 may be deposited on top of the passivation layer 170.

Figure 17:
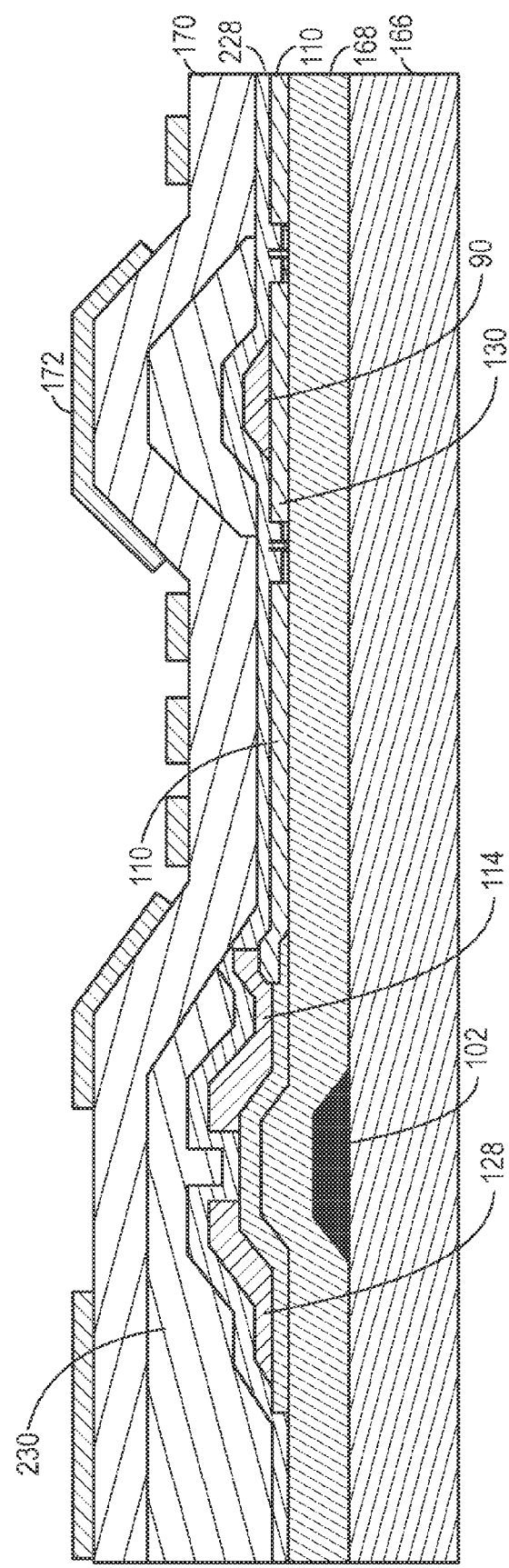
FIG. 17 is a cross-sectional view of display circuitry, taken along line 11-11 of FIG. 3, with a data line distribution segment that is deposited prior to the data line and where a source/drain passivation layer and an organic passivation layer are deposited on top of the data line, in accordance with an embodiment.

In certain embodiments where the organic passivation layer 230 may only cover the data line 90, the source 114, and the drain 128, the data line distribution segment 130 may be deposited beneath the data line 90. FIG. 17 provides one such example. Similar to the embodiment of FIG. 16, the display circuitry 58 includes a substrate 166, gate 102, and gate insulator 168. The pixel electrodes 110 and data line distribution segment 130 are deposited on top of the gate insulator 168. The source 114, drain 128, and data line 90 are deposited such that the source 114 is electrically coupled with the pixel electrodes 110 and the data line is electrically coupled with the data line distribution segment 130. A source/drain passivation layer 228 is deposited on top of the gate insulator 168, source 114, drain 128, pixel electrodes 110, data line distribution segment 130, and data line 90. The organic passivation layer 230 is deposited on top of the source 114, drain 128, data line 90, and data line distribution segment 130, while leaving a portion of the source/drain passivation layer 228 above the pixel electrodes 110 exposed.

Figure 18:
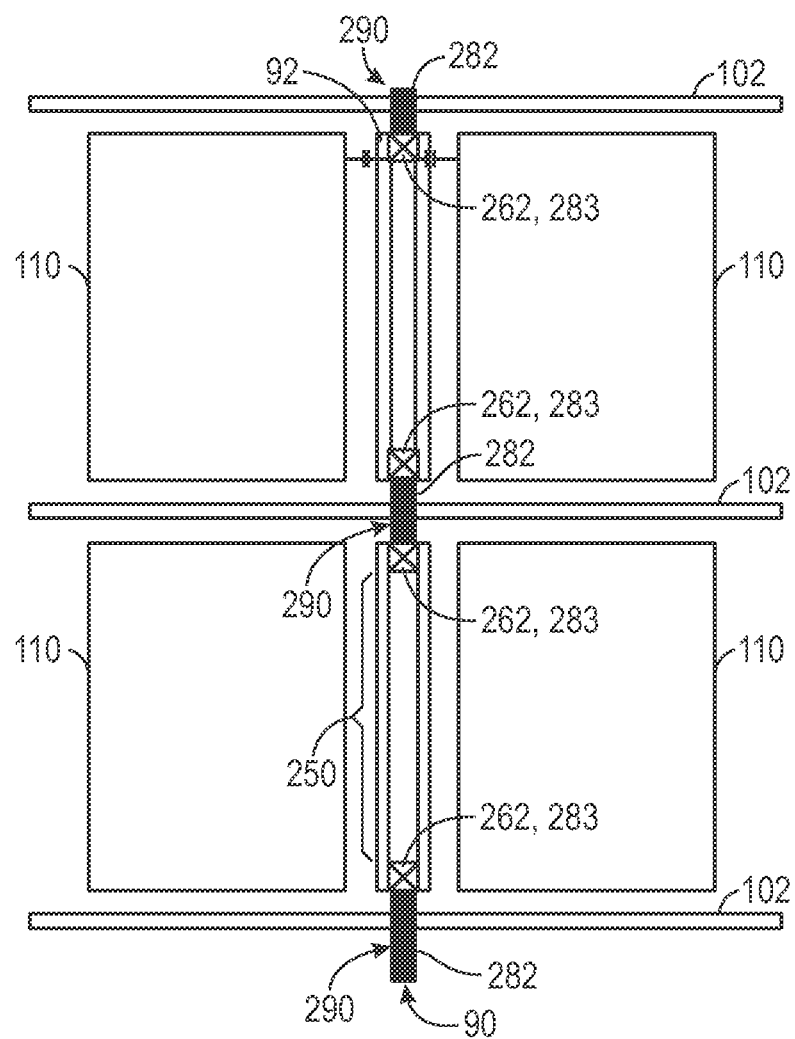
FIG. 18 is a schematic top view of the display circuitry of FIG. 19, further illustrating a second data line material coupled to the data line to span the gate segments of the display circuitry, in accordance with an embodiment.

In certain embodiments of the display circuitry 58, the gate metal utilized to form the gate 102 may be utilized to form data line portions 250 of the data line 90 because the gate metal may be more conductive than other materials of the data line, and thus the data line portions 250 may have a reduced resistance. For example, the embodiment depicted in FIG. 18 illustrates such an embodiment where the data line 90 is made up of data line portion 250 and a secondary data line material 282. The data line portions 250 may utilize the same metal used to form the gate lines 102. In such embodiments, a secondary data line material 282 may be present. As the data line portions 250 intersect with the gate lines 102, the data line 90 may need to cross the gate lines 102 disposed on the same layer as the data line portions 250. The secondary data line material 282 may be useful in crossing the gate lines 102. The secondary data line material 282 are disposed on a layer above the gate line 102 layer and are electrically coupled to the data line portions 250 through the via holes 262 and 283. The secondary data line material 282 is deposited above the gate insulator 168, thus shielding the gate lines 102 from the secondary data line material 282. Thus, data lines portions 250 may utilize the same metal as the gate lines 102, while not interfering with the gate lines 102 at the data line/gate line intersections 290.

Figure 19:
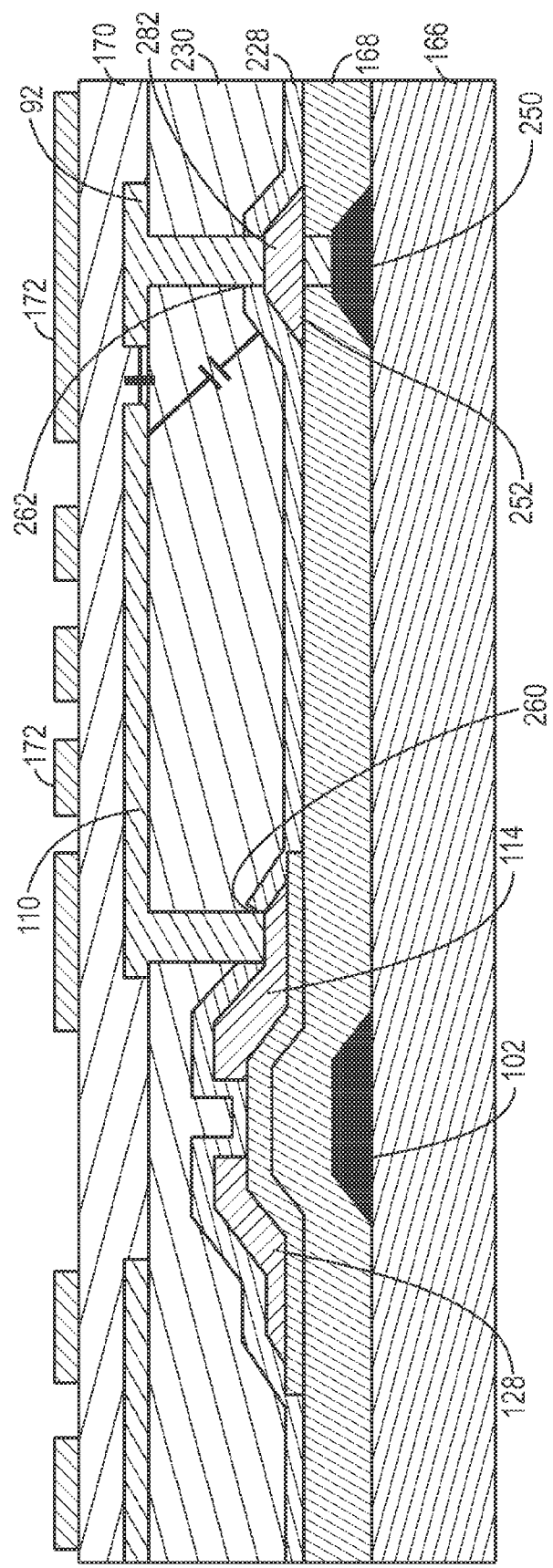
FIG. 19 is a cross-sectional view of display circuitry, taken along line 11-11 of FIG. 3, with a data line formed from gate material, deposited underneath a gate insulation layer, where the data line distribution segment is electrically coupled to the data line through a via hole disposed in the intermediate layers between the data line distribution segment and the data line.

Embodiments of the display circuitry 52, where data line portions 250 may be formed by gate metal may take on several forms. For example, FIG. 19 illustrates one such embodiment, where the data line distribution segment 130 is deposited above the data line portions 250. In the embodiment of FIG. 19, a substrate 166 forms the base layer. Gates 102 and data lines portions 250 are deposited on the substrate 166. The gates 102 and data lines portions 250 consist of the same conductive materials. A gate insulator 168 is deposited over the substrate 166, the gates 102, and the data line portions 250, which may not extend entirely across the length of the display 12. A source 114, drain 128, and secondary data line material 282 are deposited over the gate insulator 168. As will be described in more detail below, the secondary data material 282 is used to bridge or cross the gate lines 102 where the data line portions 250 and gate lines 102 intersect. A source/drain passivation layer 228 is deposited on top of the source 114, drain 128, gate insulator 168, and the secondary data line material 282. An organic passivation layer 230 is deposited on top of the source/drain passivation layer 228. Via holes 260 and 262 are disposed in the display circuitry 58. The via hole 260 is disposed over a portion of the source 114, through the organic passivation layer 230 and the source/drain passivation layer 228. The via hole 262 is disposed over the data line portions 250 through the organic passivation layer 230, the source/drain passivation layer, the secondary data line material 282, and the gate insulator 168. The pixel electrode 110 and the data line distribution segment 130 are deposited on the organic passivation layer 230. The pixel electrode 110 is electrically coupled to the source 114 through the via hole 260. The data line distribution segment 130 is electrically coupled to the data line portions 250 and the secondary data line material 282 through the via hole 262. A passivation layer 170 may be deposed on top of the pixel electrode 110, data line distribution segment 130, and the organic passivation layer 230. A common voltage electrode 126 may be deposited on top of the passivation layer 170.

Figure 20:
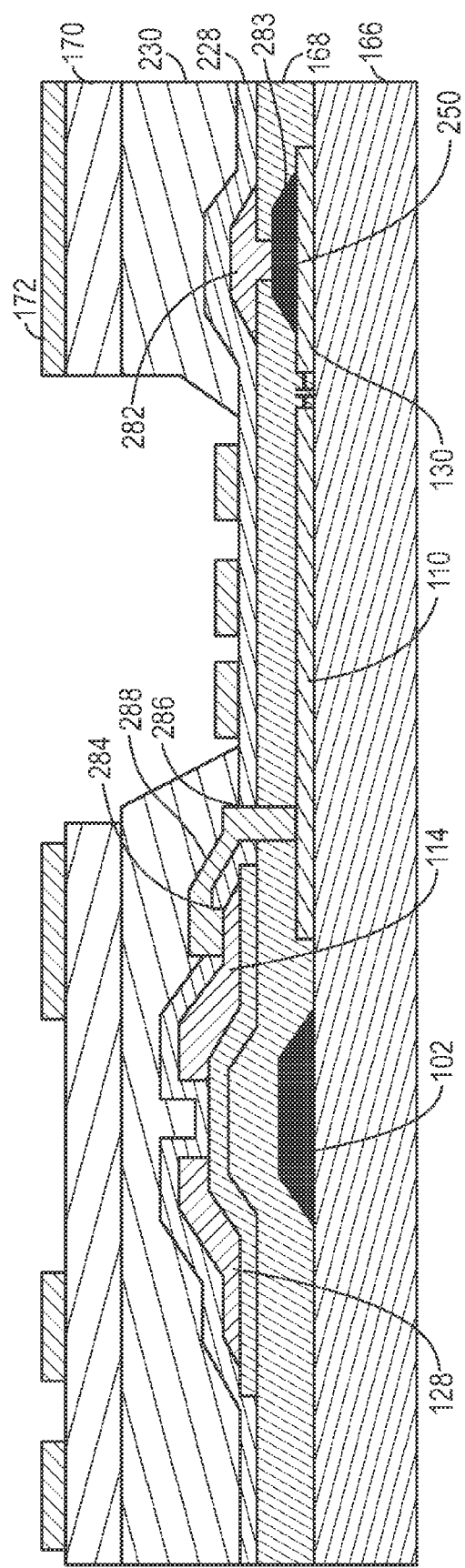
FIG. 20 is a cross-sectional view of display circuitry, taken along line 11-11 of FIG. 3, with a data line formed from gate material, deposited beneath a gate insulation layer, and a data line distribution segment deposited beneath the data line, in accordance with an embodiment.

In certain embodiments where the gate metal is utilized to form both the gate 102 and the data line portions 250, the data line distribution segment 130 may be disposed beneath the data line portions 250. For example, FIG. 20 illustrates one such embodiment. The embodiment of FIG. 19 begins with a substrate 166 as its base. A pixel electrode 110 and data line distribution segment 130 are deposited on the substrate 166. The gate 102 and data line portions 250 are deposited. The data line 280 is deposited on top of and is electrically coupled to the data line distribution segment 130. A gate insulator 168 is deposited over the substrate 166, the gate 102, the pixel electrode 110, the data line distribution segment 92. A source 114, drain, and secondary data line material 282 are deposited over the gate insulator 168. The secondary data line material 282 is electrically coupled to the data line 280 through a via hole 283 disposed over the data line 280 through the gate insulator 168. A source/drain passivation layer 228 is deposited over the gate insulator 168, the source 114, the drain 128, and the secondary data line material 282. The source 114 and pixel electrode 110 are electrically coupled through a via holes 284 and 286. The via hole 284 is disposed above the source 114, through the source/drain passivation layer 228. The via hole 286 is disposed above the pixel electrode 110, through the source/drain passivation layer 228 and the gate insulator 168. A conductive element 288 is deposited on top of the source/drain passivation layer 228 and through the via holes 284 and 286 to electrically couple the source 114 and the pixel electrode 110. An organic passivation layer 230 is deposited over a portion of the source/drain passivation layer 228 disposed above the source 114, drain 128, and data line portions 250 and over the conductive element 288. A passivation layer 170 is deposited on top of the organic passivation layer 230. Common voltage electrodes 126 may be deposited over portions of the passivation layer 170 and the source/drain passivation layer 228 not covered by the organic passivation layer 230 and passivation layer 170.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display device comprising:
    a plurality of pixels disposed in a pixel array of rows and columns, wherein each pixel comprises a pixel electrode of a first conductive material;
    a data line configured to carry image data signals to the plurality of pixels, wherein the data line is disposed between a first column and a second column of the pixel array; and
    a data line distribution segment comprising the first conductive material disposed between the first and second columns of the pixel array and spaced a substantially uniform distance between each of the first and second columns of the pixel array, wherein the data line distribution segment is electrically coupled to the data line so as to cause a first capacitance between the data line and a first pixel electrode of the first column on a first side of the data line to be substantially uniform to a second capacitance between the data line and a second pixel electrode of the second column on a second side of the data line even when the data line is disposed closer to one of the first or the second columns of pixels than the other.

2. The display device of claim 1, wherein the data line distribution segment comprises Indium tin oxide (ITO).

3. The display device of claim 1, wherein the data line is narrowed along a portion of the data line distribution segment to reduce capacitance between the data line and the pixel electrodes of the two columns of the pixel array.

4. The display device of claim 1, comprising a metal gate line, wherein the data line and the metal gate line comprise a common material more conductive than other materials of the data line layer to reduce resistance in the data line layer.

5. The display device of claim 4, wherein a second data line material crosses the metal gate line at an intersection between the metal gate line and the data line, and wherein the data line distribution segment is disposed above the data line layer and is electrically coupled to the common material of the data line and the second data line material through a via hole disposed in the second data line material.

6. The display device of claim 4, wherein a second data line material crosses the metal gate line at an intersection between the metal gate line and the data line, and wherein the second data line material is electrically coupled to the common material of the data line though a via hole disposed in an intermediate layer between the second data line material and the common material of the data line and wherein the data line distribution segment is disposed beneath the data line.

7. The display device of claim 1, wherein the data line distribution segment is disposed above the data line.

8. The display device of claim 7, comprising:
    an organic passivation layer disposed above a source/drain passivation layer; and
    a via hole disposed in the organic passivation layer and the source/drain passivation layer above the data line;
    wherein the data line distribution segment is disposed above the organic passivation layer and the source/drain passivation layer, the data line is disposed below the source/drain passivation layer, and the data line distribution segment is electrically coupled to the data line through the via hole.

9. The display device of claim 7, comprising:
    a source/drain passivation layer disposed above the data line;
    a via hole disposed through the source/drain passivation layer above the data line; and
    an organic passivation layer disposed above the data line;
    wherein at least a portion of the data line distribution segment is disposed between the organic passivation layer and the source/drain passivation layer, and the data line distribution segment is electrically coupled to the data line through the via hole.

10. The display device of claim 1, wherein the data line is disposed above the data line distribution segment.

11. The display device of claim 10, comprising: a source/drain passivation layer disposed above the data line; and an organic passivation layer disposed above the source/drain passivation layer.

12. An electronic device comprising:
    a storage configured to store image data for a display;
    a processor configured to provide the image data to the display; and
    the display, comprising:
        first and second conductive pixel segments;
        a conductive data line distribution segment disposed between the conductive pixel segments; and
        a data line configured to send image data signals to pixels of the display, wherein the data line layer is electrically coupled to the data line distribution segment, wherein the first conductive pixel segment is in a first column on a first side of the data line and wherein the second conductive pixel segment is in a second column on a second side of the data line, and wherein the distance between the data line and each of the first and second conductive pixel segments is not uniform;
    wherein the capacitance between the first conductive pixel segment in the first column on the first side and the data line is substantially similar to the capacitance between the second conductive pixel segment in the second column on the second side and the data line despite the distance between the data line and each of the first and second conductive pixel segments not being uniform.

13. The electronic device of claim 12, wherein a ratio of capacitance between the first conductive pixel segment and the data line to the second conductive pixel segment and the data line is less than or equal to approximately 100%-115%.

14. A method of manufacturing electronic display devices, the method comprising:
   depositing a conductive data line distribution segment across a display panel wafer;
   depositing a data line configured to send image data signals to pixels of the display devices on top or below the data line distribution segment across the display panel wafer, wherein the data line is electrically coupled to the data line distribution segment;
   wherein the data line distribution segment and the data line are disposed between and substantially parallel to pixel electrodes disposed on the display panel wafer; and
   wherein the data line distribution segment is configured to create substantially similar data line-to-pixel capacitances of:
   a first capacitance between the data line and the pixels to the left of the data line; and
   a second capacitance between the data line and the pixels to the right of the data line.

15. The method of claim 14, wherein the display panel wafer is at least approximately 2.5 meters by 2 meters.

16. A method of forming display circuitry, comprising:
   depositing a first layer comprising:
      first and second pixel electrodes; and
      a data line distribution segment, wherein the data line distribution segment is disposed between the first and second pixel electrodes, a first distance between the first pixel electrode and the data line distribution segment on a first side of the data line being substantially similar to a second distance between the second pixel electrode and the data line distribution segment on a second side of the data line, wherein the data line distribution segment is configured to distribute conductive properties of a data line substantially evenly between the first pixel electrode on the first side and second pixel electrode on the second side when the data line is electrically coupled to the data line distribution segment, such that a first capacitance between the data line and the first pixel electrode is substantially uniform with a second capacitance between the data line and the second pixel electrode, regardless of whether the data line is uniformly spaced between the first and second pixel electrodes; and
   depositing a second layer comprising the data line, wherein the data line is electrically coupled to the data line distribution segment.

17. The method of claim 16, wherein the first layer is deposited prior to the second layer being deposited.

18. The method of claim 17, comprising:
   depositing a source/drain passivation layer after depositing the second layer; and
   depositing an organic passivation layer over the data line.

19. The method of claim 16, wherein the second layer is deposited prior to the first layer being deposited.

20. The method of claim 19, wherein the data line is electrically coupled to the data line distribution segment disposed above the data line through a via hole disposed through a source/drain passivation layer and the data line distribution segment passes through the via hole to electrically couple with the data line.

21. The method of claim 19, comprising:
   depositing an organic passivation layer and a source/drain passivation layer prior to depositing the second layer, wherein the source/drain passivation layer is deposited prior to the organic passivation layer;
   disposing a via hole through the organic passivation layer and the source/drain passivation layer prior to depositing the second layer; and
   depositing the second layer through the via hole to electrically couple with the data line.

22. The method of claim 19, comprising:
   depositing a source/drain passivation layer prior to depositing the second layer;
   disposing a via hole through the source/drain passivation layer;
   disposing the second layer through the via hole to electrically couple the data line distribution segment with the data line; and then
   depositing an organic passivation layer over the data line.

23. An etching pattern for an intermediate stage for manufacturing a display panel comprising:
   one or more masks configured to pattern a first pixel electrode on one side of a data line and a second pixel electrode on a second side of the data line and to pattern a data line distribution segment during a common intermediate stage, between the first and second pixel electrodes, wherein the data line distribution segment is spaced a uniform distance between the first pixel electrode on the first side of the data line and the second pixel electrode on the second side of the data line and is configured to distribute conductive properties of a data line substantially evenly between the first pixel electrode on the first side and second pixel electrode on the second side when the data line is electrically coupled to the data line distribution segment, such that a first capacitance between the data line and the first pixel electrode is substantially uniform with a second capacitance between the data line and the second pixel electrode, regardless of whether the data line is uniformly spaced between the first and second pixel electrodes.

* * * * *